April 26, 1966   H. REINSCH   3,248,166
LIGHT MEASURING STRUCTURES FOR MOTION PICTURE CAMERAS
Filed April 3, 1962   2 Sheets-Sheet 1
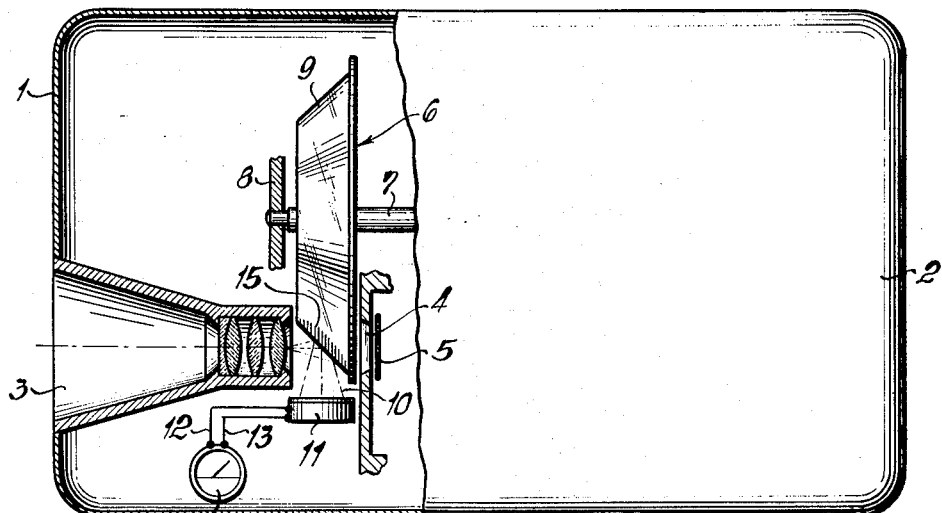
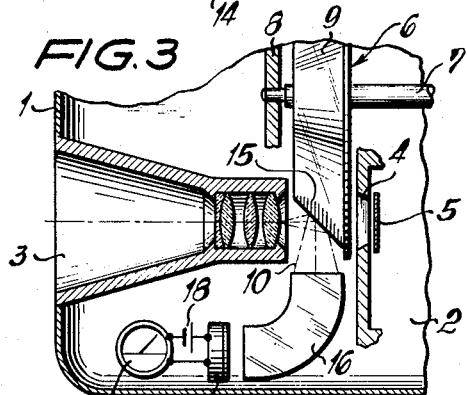
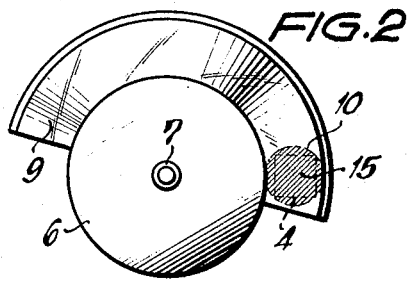
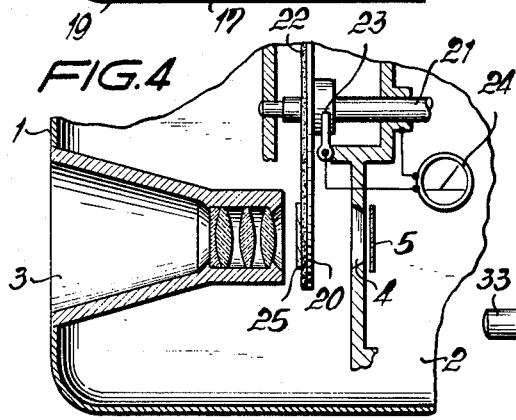
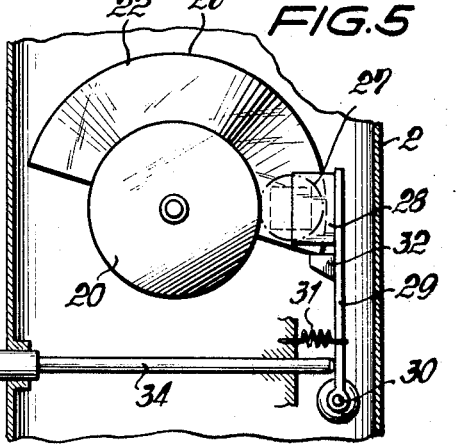
INVENTOR
Herbert Reinsch
by Michael S. Strike
Attorney April 26, 1966          H. REINSCH          3,248,166
LIGHT MEASURING STRUCTURES FOR MOTION PICTURE CAMERAS
Filed April 3, 1962          2 Sheets-Sheet 2
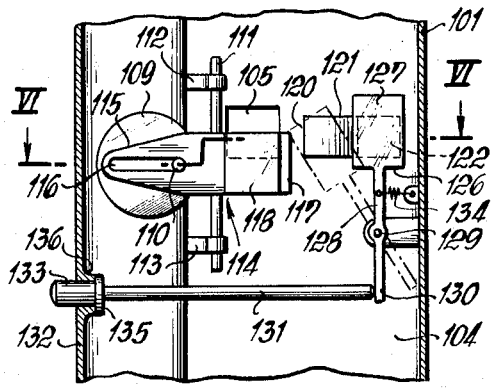
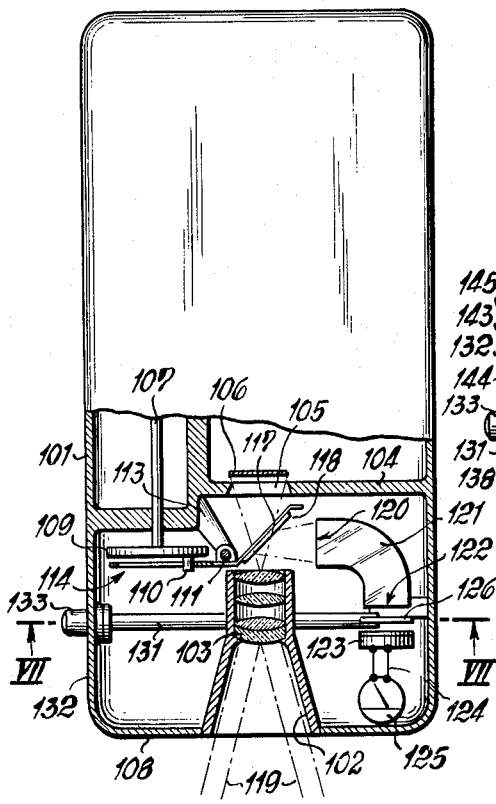
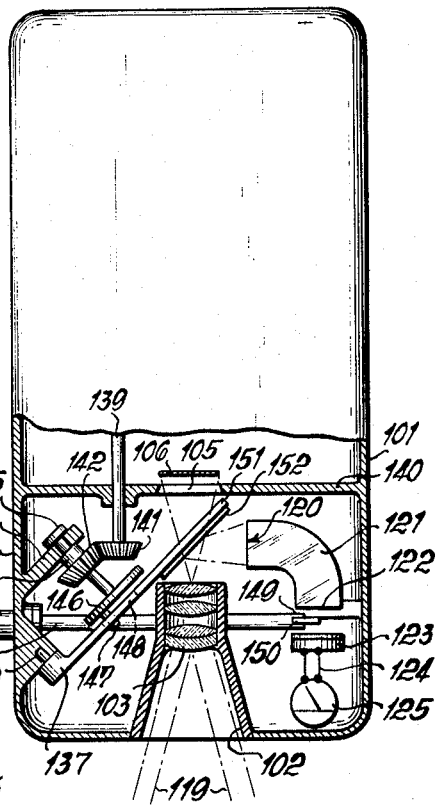
INVENTOR
Herbert Reinsch
by Michael S. Striker
Attorney

United States Patent Office 3,248,166
Patented Apr. 26, 1966

3,248,166
LIGHT MEASURING STRUCTURES FOR MOTION PICTURE CAMERAS
Herbert Reinsch, Stuttgart, Germany, assignor to Eugen Bauer G.m.b.H., Stuttgart-Unterturkheim, Germany
Filed Apr. 3, 1962, Ser. No. 184,708
Claims priority, application Germany, Apr. 5, 1961, B 62,018
11 Claims. (Cl. 352—141)

The present invention relates to motion picture cameras.

More particularly, the present invention relates to light-measuring structures for motion picture cameras.

It is conventional in modern motion picture cameras to provide a light-measuring structure which is capable of measuring the light received by the camera so that in accordance with this light measurement it is possible to set, either manually or automatically, the diaphragm so as to provide a proper exposure of the film according to the lighting conditions. Most light-measuring structures of conventional motion picture cameras receive the light at a part of the camera displaced from the objective thereof, and because of this fact there are certain inaccuracies inherent in this conventional arrangement. First, the window through which light reaches the conventional light-measuring structure may receive more light from the sky, under certain conditions, than the objective of the camera, and under certain other conditions there may be other variations between the light received by the light-measuring structure and the light which passes through the objective, so that the camera is not always capable of being precisely set in accordance with the lighting conditions with such an arrangement. It is, of course, far more desirable to measure the light which passes through the objective of the camera, since this is the light which reaches the film, and therefore when using this light to set the camera a far more accurate setting is achieved under all conditions of operation. However, there are certain problems involved in measuring the light which passes through the objective of a motion picture camera. Thus, the film-exposing aperture is cyclically covered and uncovered by the shutter of the camera so that during each cycle of operation of the shutter there is a predetermined fraction of each cycle during which no light reaches the film, and it is only during the portion of each cycle that the exposure aperture is uncovered that light actually passes from the objective to the film, and thus the light-measuring structure must be arranged to take into account the fact that the shutter covers and uncovers the exposure aperture during each cycle of operation of the shutter. Furthermore, the structure should be capable of accurately measuring the light not only during opertaion of the camera but also when the camera is not operating, so that just prior to starting of the operation of the camera the diaphragm thereof will have a proper setting. Of course, when the camera is not operating the shutter is stationary and in a position covering the exposure aperture, so that it is necessary at this time to be able to measure the light in such a way that the light measurement will correspond accurately to the light which reaches the film during operation of the camera when the shutter is cyclically covering and uncovering the exposure aperture. Although there have already been attempts to solve these problems, so far a satisfactory solution has not been found because the structures which have been proposed heretofore do not operate reliably over a long period of time. Variations in temperature and aging of the parts influence the accuracy of the measurements made with conventional constructions.

It is accordingly a primary object of the present invention to provide a light-measuring structure which will be capable of measuring the light passing through the objective of the camera in such a way that proper compensation will be made for the fact that the exposure aperture is cyclically covered and uncovered by the shutter during operation of the camera.

Another important object of the present invention is to provide a camera structure of this type which will be capable of measuring the light passing through the objective when the camera is not operating in such a way that the light measurement will correspond accurately to the light received by the film during operation of the camera.

Still another object of the present invention is to provide a structure of the above type which will not be influenced by temperature changes or by aging so that the structure of the invention will provide accurate setting of the camera even after the camera has been used for a long period of time.

It is furthermore an object of the present invention to provide a structure of the above type which is exceedingly compact and does not require the dimensions of the camera to be undesirably enlarged in order to accommodate the various elements of the structure of the invention.

It is furthermore an object of the present invention to provide a structure which will automatically provide when the camera is stationary a light measurement corresponding accurately to that which is made during operation of the camera so that no special elements need be set by the operator in order to provide for proper light measurement when the camera is not operating.

It is also an object of the present invention to provide a structure capable of accomplishing all of the above objects and at the same time composed of simple rugged elements which are very reliable in operation.

With the above objects in view, the invention includes, in a motion picture camera, an objective and a film-exposing aperture located along the optical axis of the objective and through which film is exposed. A shutter means moves cyclically between the objective and the aperture to cover and uncover the aperture during each cycle of operation of the shutter means, and this shutter means has a rest position covering the aperture. A photosensitive means receives light which has passed through the objective only when the shutter is located between the objective and the film-exposing aperture, and a measuring means cooperates with the photosensitive means for measuring the light received thereby. In accordance with the present invention, a light-reducing means cooperates with the photosensitive means for reducing the light received thereby when the shutter means is in its rest position to an extent which will transmit to the photosensitive means, when the shutter means is in its rest position, an amount of light which at least approximately equals the amount of light received by said photosensitive means during operation of the shutter means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partly sectional, diagrammatic illustration of one possible embodiment of a motion picture camera according to the present invention;

FIG. 2 shows in elevation the rotary shutter structure of FIG. 1;

FIG. 3 is a fragmentary, partly sectional, diagrammatic illustration of another embodiment of a light-measuring structure according to the present invention;

FIG. 4 is a fragmentary, sectional, diagrammatic illustration of yet another embodiment of a light-measuring structure according to the present invention;

FIG. 5 is a fragmentary diagrammatic partly sectional illustration of a structure identical with that of FIG. 4 but having a different light-reducing means to provide for proper light measurement when the camera is not operating;

FIG. 6 is a partly sectional, diagrammatic illustration of still another embodiment of a motion picture camera according to the present invention;

FIG. 7 is a sectional view of the structure of FIG. 6 taken along line VII—VII of FIG. 6 in the direction of the arrows; and FIG. 8 is a partly sectional, diagrammatic illustration of yet another embodiment of a light-measuring structure for a motion picture camera, according to the present invention.

Referring to FIG. 1, it will be seen that the front wall 1 of the camera housing 2 carries an objective 3. Along the optical axis of the objective 3 is located the film-exposing aperture 4 behind which the film 5 is located, and this film 5 is advanced in a stepwise manner during operation of the camera, as is well-known in the art, and when the film 5 is stationary it is exposed through the aperture 4.

A rotary shutter means 6 is provided to cover and uncover the aperture 4, this shutter means 6 operating cyclically to cover and uncover the aperture 4 during each cycle of operation of the shutter means 6, and, as is well-known, during that portion of each cycle when the shutter covers the aperture 4 the film 5 is advanced by a distance equal to one film frame, while when the aperture 4 is uncovered during a portion of each cycle the film 5 remains stationary and it is exposed with the light which reaches the film through the objective 3. The rotary shutter means is carried by a shaft 7 which extends parallel to the optical axis and which is supported for rotation by any suitable structure such as the bearing 8 diagrammatically illustrated in the drawing, and the shaft 7 is rotated through any suitable drive mechanism well-known in the art. The rotary shutter means includes a portion 9 which forms part of a frustocone, and it is this portion 9 of the shutter means which actually covers and uncovers the aperture 4. As is apparent from FIG. 2, the frusto-conical portion 9 of the shutter means 6 extends angularly through approximately 180° about the axis of the shaft 7. The portion of the shutter means which is fixed to the shaft 7 is in the form of a circular plate, and the portion 9 extends from and is integral with the periphery of the circular plate, as is apparent from FIG. 2. During each revolution of the rotary shutter means 6, the portion 9 thereof will cover and uncover the aperture 4, as is apparent from FIG. 2. The outer surface of the portion 9 of the shutter means is light-reflecting. Thus, this portion at least of the shutter means may be made of a shiny metal which has a high capacity for reflecting light, or the portion 9 may be coated with any suitable layer of material which is capable of reflecting light to a high degree. As is apparent from FIG. 1, when the shutter means is located between the aperture 4 and the objective 3, the exterior light-reflecting surface of the portion 9 of the shutter means receives light from the objective 3 and reflects this light in a direction perpendicular to the optical axis. The cone of which the surface 9 forms a part has an apex angle of 90° so that the light will be reflected through 90° from the optical axis away from the exterior surface of the portion 9, in the manner indicated in FIG. 1. The light rays 10 which are thus reflected from the exterior surface of the portion 9 of the shutter means 6 are received by a photosensitive means 11 which is mounted in any suitable way within the camera in the path of the light rays 10, in the manner shown in FIG. 1. This photosensitive means 11 may be in the form of a photocell or it may be in the form of an electrical resistor whose resistance varies with variations in light intensity, as is well-known in the art. Where a photosensitive resistor is used there will be a battery in the circuit of the photosensitive means. Where a photocell is used, a voltage will be generated, as is well-known in the art by impingement of the light on the photocell and through the conductors 12 and 13 a suitable meter 14 such as a galvanometer, for example, is electrically connected with the photosensitive means 11 so as to measure the light received thereby, also in a manner well-known in the art. The meter 14 may be so arranged that the operator may see the amount of light reaching the photosensitive means 11 and can then manually set the diaphragm of the camera, or the meter may be connected in a well-known way directly to the diaphragm for automatically setting the latter. This diaphragm will conventionally form part of the objective assembly and is well-known in the art.

When the rotary shutter means 6 is in its rest position a part of the portion 9 thereof is located between the aperture 4 and the objective 3 covering the aperture 4, as is indicated in FIG. 2. Therefore, at this time the photosensitive means 11 would receive all of the light passing through the objective 3, if no measures were taken to reduce the amount of light received by the photosensitive means 11 when the shutter means 6 is in its rest position during the time when the camera is not operating. It is necessary to reduce the amount of light received by the photosensitive means from the reflecting surface of the shutter means when the latter is in its rest position since otherwise the photosensitive means would receive at this time an amount of light which would correspond to that which would be received if the portion 9 extended through a complete circle. In other words, during each operating cycle of the shutter means, which is to say during each revolution of the rotary shutter means 6, the portion 9 thereof covers the aperture 4 during approximately one-half of a revolution and uncovers the aperture 4 during the remaining half of the revolution, so that during each cycle of operations the photosensitive means does not continuously receive light from the reflecting surface of the portion 9 of the rotary shutter means 6. Since the portion 9 of the shutter extends through approximately one-half of a circle the photosensitive means 11 receives during each operating cycle approximately one-half the amount of light which would be received if the portion 9 extended through a complete circle. Therefore, in order to provide an accurate measurement when the shutter means is in its rest position, it is necessary to reduce the amount of light transmitted to the photosensitive means at this time by approximately one-half, and in the embodiment of FIGS. 1 and 2, this result is achieved by the means 15. This means 15 takes the form of a coating located on the reflecting surface of the portion 9 of the shutter at the part thereof which receives light from the objective when the shutter means is in its rest position, and this coating is made of a material which reduces by one-half the amount of light reflected from the exterior surface of the portion 9 of the rotary shutter. In other words the part of the shutter which reflects light when the shutter is stationary has approximately one-half the light-reflecting capacity of the remainder of the portion 9 of the shutter, so that in this way when the camera is stationary the photosensitive means 11 will receive the same amount of light as is received by this photosensitive means during operation of the shutter. Without the means 15, the photosensitive means 11 would receive when the shutter is stationary twice the amount of light which is received by the photosensitive means during operation of the camera, so that since the light-reducing means 15 reduces the amount of light reflected by the shutter by one-half, the photosensitive means 11 receives even when the camera is not operating the same amount of light which is received during operation of the camera, so that the camera may be properly set to provide a proper exposure just before the camera is set into operation.

Of course, in the above example it is assumed that the portion 9 of the shutter will cover the aperture 4 during one-half of each operating cycle. With other shutters this fraction may be different, and the light-reducing means of the invention is designed in all cases so as to reduce the light to an extent which will transmit to the photo-sensitive means when the shutter means is in its rest position an amount of light equal to that received by the photosensitive means during operation of the camera. In the case of a rotary shutter of the type shown in FIGS. 1 and 2, the light-reducing means 15 will reduce the light by the fractional part of a circle through which the portion 9 extends.

As was pointed out above, the electrical circuit of the photosensitive means will include a battery where a photosensitive electrical resistor is used, and such an arrangement is particularly suitable when dealing with relatively small amounts of light.

In the embodiment of the invention which is illustrated in FIG. 3, all of the parts are the same except that the photosensitive means is in the form of a photosensitive resistor and is poistioned differently from the arrangement shown in FIG. 1. In the embodiment of FIG. 3 a light-conducting means 16 is arranged to receive the light reflected from the portion 9 of the rotary shutter means, and this means 16 takes the form of any suitable material which is capable of transmitting light. For example, the product sold under the trademark, Lucite is suitable for such purposes. The light enters through one end face of the light-conducting means 16 and issues through the other end face thereof after passing through the curved element 16 which is supported in any suitable way within the camera. The light issuing from the light-conducting means 16 reaches the photosensitive resistor 17 in the electrical circuit of which is located not only the meter 19 but also the battery 18. With this arrangement it is much easier to position and assemble the parts, and the photosensitive structure in particular.

With the embodiment of the invention which is illustrated in FIG. 4, the housing 2 also carries the objective 3 along the optical axis of which is located the film-exposing aperture 4 behind which is located the film 5 which is to be exposed. In this embodiment the rotary shutter means includes a flat disc 20 which extends angularly through such an angle that the aperture 4 will be covered and uncovered during each operating cycle. The disc 20 is fixedly carried by a rotary shaft 21 driven in any suitable way and supported for rotation about its axis, this shaft 21 also extending parallel to the optical axis. The disc 20 carries an arcuate portion 22 (FIG. 5) which extends through 180° about the axis of the shaft 21 and which covers and uncovers the aperture 4 during each revolution, as is particularly apparent from FIG. 5. The arcuate portion of the shutter which covers and uncovers the aperture is provided with a photosensitive coating 22 which directly receives the light from the objective 3. Thus, whenever the shutter is located between the aperture 4 and the objective the photosensitive layer 22 which rotates with the shutter will receive light from the objective so that a voltage will be generated, and through a slip ring and the electrically conductive contact 23 with respect to which the slip ring slides the photosensitive layer 22 is located in an electrical circuit which includes the light-measuring meter 24 which is electrically connected to the contact 23 and to ground, as indicated diagrammatically in FIG. 4. Thus, the meter 24 may be in the form of a galvanometer which will measure the voltage generated in the layer 22 and in this way it is possible either for the operator to determine from the meter 24 the amount of light and to set the camera manually or for the diaphragm of the camera to be automatically set in a manner well-known in the art.

The part of the coating 22 which receives light when the shutter means 20 is in its rest position is covered with a light-reducing layer 25 which reduces the amount of light received by the layer 22 by one-half, so that in this case also where the aperture 4 is covered during approximately one-half of each revolution the meter 24 will provide a proper reading when the shutter means is in its rest position. Thus, with the arrangement of FIG. 4 also the meter 24 will provide the same reading for a given amount of light passing through the objective 3 irrespective of whether the shutter means 20 is operating or is at rest.

The shutter means, objective, film-exposing aperture, and light measuring structure of FIG. 5 are identical with that of FIG. 4. In the embodiment of FIG. 5, however, the light-reducing means is constructed differently. Thus, instead of providing a light-reducing means in the form of a layer of material 25 directly carried by the photosensitive layer 22 and reducing the amount of light received thereby, the embodiment of FIG. 5 has an opaque element 27 which is positioned between the objective and the photosensitive means 22 only when the shutter is not operating. Thus, in the embodiment of FIG. 5, the arcuate portion 26 of the shutter 20 is also covered with the layer 22 of photosensitive material, but in this case, when the shutter is stationary the light rays 27 which pass through the objective 3 are intercepted by the opaque plate 28. This opaque plate 28 forms part of a light-reducing means which includes the arm 29 which fixedly carries the plate 28 and which is pivotally supported on a stationary pivot 30 carried by any suitable part of the camera. As is shown diagrammatically in FIG. 5, a spring 31 urges the arm 29 and the light-reducing means 28 to turn in a counterclockwise direction, as viewed in FIG. 5. A stop means 32 is carried by the arm 29 and engages an end of the arcuate portion 26 of the shutter to stop the operation of the camera. A push-button 33 is accessible to the operator and is guided by a suitable bearing in a side wall of the camera housing, and this push-button 33 is fixed to an elongated rod 34 which is guided for axial movement and which engages at its free end the rod 29. When the parts are in their rest position shown in FIG. 5, the light-reducing means 28 will be located in the path of exactly one-half of the light rays 27, so that with this arrangement only one-half of the amount of the light passing through the objective will reach the photosensitive means 22. When the operator depresses the button 33, the rod 34 acts on the arm 29 to turn the latter in a clockwise direction, as viewed in FIG. 5, in opposition to the spring 31, so that the stop means 32 moves away from the shutter to release the camera for operation and at the same time the light-reducing means 28 moves out of the path of the light rays 27, so that now the light can travel without any obstruction from the objective alternately to the photosensitive means 22 and the aperture 4 during each operating cycle. Therefore, with the arrangement of FIG. 5 the photosensitive means 22 will receive light from the objective during precisely one-half of each revolution while when the camera is not operating precisely one-half of the amount of light reaching the photosensitive means 22 is obstructed, so that the meter will provide the same reading, for a given amount of light, irrespective of whether the camera is operating or is at rest.

It should be noted that with the embodiment of FIG. 5 the arcuate portion 26 and the layer 22 extend through precisely 180° while the light-reducing means 28 obstructs precisely one-half of the light which has passed the objective. This is not true of the embodiments of FIGS. 1–4, since in these embodiments the light-reducing means passes the objective during each operating cycle, so that the extent to which the light is reduced by the light-reducing means 15 or 25 corresponds to the actual effective extent of the light-reflecting surface of the portion 9 of the shutters of FIGS. 1–3 or the actual effective area of the layer 22 of FIG. 4 which receives light from the objective during each operating cycle.

Instead of the stop means 32 of FIG. 5, the depression of the push-button 33 may actuate any well-known release mechanism for starting the operation of the camera.

The light-reducing means 15 or 25 may take the form of a covering through which light can only pass in part, the proportion of light which passes through being approximately one-half of the amount of light which reaches these materials, and such materials are well-known in the art, or the light-reducing means 15 or 25 may take the form of opaque material which covers only one-half the area of the shutter which receives light from the objective when the shutter is in its rest position. Such opaque covering material may be in the form of a single piece of material which covers one-half of the area which receives light from the objective when the shutter is stationary, or the light-reducing means may be in the form of particles of material or relatively small pieces of material which are distributed over one-half of the area of the shutter which receives light from the objective when the shutter is in its rest position. Where the shutter has a light-reflecting coating applied thereto, the light-reducing means may take the form of a single or several portions of this coating which are eliminated at the area which receives light from the objective when the shutter is stationary, so as to reduce the light-reflecting capacity of this area, and of course in the above-described embodiments the extent of the reduction of the light-reflecting capacity of the area which receives light from the objective when the shutter is stationary will be by one-half, simply by eliminating from this area one-half of the light-reflecting material either in the form of several small cutouts or one large cutout equal to one-half of the area which receives light from the objective when the shutter is stationary.

With the above-described embodiments of the invention, while the shutters are of the rotary type so that they operate smoothly, nevertheless it is necessary to make the camera of a large enough size to provide a free space in which the shutter can rotate. Thus, referring to FIG. 5, for example, it will be seen that the left side wall of the camera, as viewed in FIG. 5, must be displaced from the turning axis of the shutter 20 by a distance sufficiently great to permit the shutter to rotate freely. With the embodiments of the invention illustrated in FIGS. 6–8, oscillatory shutters are used, and as will be apparent from the description which follows, the size of the camera can be reduced considerably as compared to that of FIGS. 1–5, and at the same time the mass of the shutter which is required to oscillate is maintained at a minimum so that there are no undesirable forces set up by the oscillating movement of the shutter.

Referring to FIGS. 6 and 7, the camera housing 101 illustrated therein is provided at its front wall 108 with an entrance element 102 for the light which in this way reaches the objective 103. A transverse wall portion 104 in the interior of the camera housing is provided with the film-exposing aperture 105 behind which is located film 106 which is to be exposed and which is advanced in a stepwise manner, as is well known in the art.

A rotary shutter-driving shaft 107 extends parallel to the optical axis and is supported by suitable bearings, including one carried by the wall 104, for rotation, this shaft 107 being driven in any suitable way well known in the art. At the end of the shaft 107 which is directed toward the front wall 108 of the camera, a disc 109 is fixed to the shaft 107 to rotate therewith, and this disc 109 fixedly carries a pin 110 which is spaced from the axis of the shaft 107. In this way the parts 107, 109, 110 form a rotary crank means.

The wall 104 fixedly carries a pair of supports 112 and 113 which support a bar 111 along which the shutter means slides, so that the parts 111–113 form a guide means which guide the shutter for oscillatory movement. The shutter means 114 has a left portion 115, as viewed in FIG. 7, which is located in a plane normal to the shaft 107 and thus normal to the optical axis, and this portion 115 of the shutter means is formed with an elongated slot 116 which receives the pin 110. The right portion 117 of the shutter means 114, as viewed in FIGS. 6 and 7, is located in a plane which extends across the optical axis at an angle of 45° thereto, and this portion 117 is flat and forms the shutter which covers and uncovers the aperture 105 when the shutter is oscillated through its operating cycles by the oscillating means formed by the rotary crank structure in cooperation with the slotted extension 115 of the shutter element 117. The surface of the shutter 117 which is directed toward the objective 103 is provided with a layer 118 of a material which has a high light-reflecting capacity. Thus, the layer 118 may be in the form of a thin mirror carried by the flat shutter 117 at its surface which is directed toward the objective, or it may be a thin layer of a shiny metal, or the like.

The light rays 119 which pass through the objective 103 form a sharp image on the film 106 when the aperture 105 is not covered by the shutter 117. When the shutter 117 is located between the aperture 105 and the objective 103, the light reflecting surface 118 of the shutter 117 reflects the light which passes through the objective 103 to the right, as viewed in FIG. 6. The light which is reflected in this way is received by the end face 120 of a light-conducting means 121, in the form of a bar of the product sold under the trademark Lucite which, for example, is curved in the manner shown most clearly in FIG. 6, so that in this way the direction of the light reflected laterally from the optical axis by the surface 118 is changed by 90° and the light issues from the end face 122 of the light-conducting means 121 in a direction parallel to the optical axis. Located adjacent to the end face 122 of the light-conducting means 121 is a photosensitive means 123 which receives the light from the light-conducting means 121, and in the illustrated example the photosensitive means 123 takes the form of a photocell which through the electrical connection 124 is connected with the galvanometer or the like 125 which serves to measure the amount of light received by the photosensitive means 123. Thus, the position of the pointer of the galvanometer 125 will be indicative of the amount of light received by the photosensitive means 123, so that the operator can properly set the camera, or, if desired, the meter may be connected with the unillustrated diaphragm to automatically set the latter in a manner well known in the art.

A light-reducing means 126 is located between the end face 122 and the photosensitive means 123. This light-reducing means is in the form of a plate portion 127 through which light can pass but which reduces the amount of light passing therethrough, and the plate portion 127 is carried by an elongated arm 128 with which it is integrally connected, for example. The plate portion 127 is large enough to cover the entire end face 122 of the light conducting means 121. The arm 128 is supported by a stationary pivot 129 for turning movement, and a portion 130 of the arm 128 extends beyond the pivot 129 in the manner shown in FIG. 7. The free end of an elongated rod 131 engages the portion 130 of the arm 128, and the rod 131 is integral with a push-button element 133 slidable in opening 136 of the side wall 132 of the camera, this opening 136 forming a bearing for the push-button 133 which is fixedly connected with a collar 135 which engages the right end of the bearing 136, as viewed in FIG. 7, so as to limit movement of the push-button 133 and the rod 131 to the left, as viewed in FIG. 7. A spring 134 is connected to the arm 128 and to a stationary part of the camera to urge the arm 128 in a clockwise direction, as viewed in FIG. 7, and in this way the spring acts through the arm 128 on the rod 131 to urge the latter to the left to the position shown in FIG. 7.

In the position of the parts shown in FIG. 7, the operating button of the camera has been released, this button being the push-button 133, for example, but the shutter has not yet reached its rest position. The structure which stops and starts the camera is conventional and well known and when the button 133 is released the camera will automatically come to a stop where the shutter 117 covers the aperture 105, and thus upon release of the button 133 the rotary crank means will continue to operate until the pin 110 reaches its uppermost position where the shutter 117 covers the aperture 105. In this rest position of the shutter all of the light which passes through the objective 103 will be reflected to the end face 120 of the light-conducting means 121. Thus, the light from the objective which would be used to expose the film is instead reflected to the end face 120, and this light is guided through the light-conducting means 121 to the end face 122 thereof from which the light issues. The light then passes through the portion 127 of the light-reducing means which permits only a fractional part of the light to reach the photosensitive means 123, and thus the meter 125 will give a reading which is correspondingly reduced.

In order to set the camera into operation the operator will depress the button 133 so that the camera is released in the well known manner for operation, and thus the shaft 107 turns and the rotary crank means acts through the extension 115 of the shutter 117 to oscillate the latter back and forth in its plane passing through the optical axis along a path which causes the shutter 117 to cover and uncover the aperture 105 during each operating cycle. Whenever the shutter 117 is located between the objective and the film-exposing aperture 105, light from the objective will be reflected by the surface 118 of the shutter and will move through the light-conducting means 121 to the photosensitive means 123. Simultaneous with the releasing of the camera for operation, the depression of the button 133 causes the rod 131 to turn the arm 128 in opposition to the spring 134 to the position shown in dot-dash lines in FIG. 7 where the portion 127 of the light-reducing means 126 is no longer located in alignment with the end face 122 of the light-conducting means 121. Thus, during operation of the camera the light which reaches the photosensitive means 123 is not diminished by the light-reducing means 126. Therefore, during operation of the camera the light is intermittently transmitted to the photosensitive means 123 during a fractional part of each operating cycle, and the extent to which the element 127 reduces the light passing therethrough is equal to the extent required to reduce the total light passing through the objective 103 to a value equal to the average amount of light received by the photosensitive means 123 during each operating cycle. Thus, in this case also the meter 125 will give the same reading for a given amount of light irrespective of whether the camera is operating or is at rest.

This arrangement is of particular advantage where the camera is set automatically or semi-automatically. Thus, the measuring means 125 may be used to set the diaphragm of the camera in a fully automatic manner, or in a semi-automatic manner the operator may be required, for example, to match a pair of indices with each other in order to properly set the diaphragm, and in either case with the structure of the invention the diaphragm will be properly set even before the camera starts to operate.

The oscillatory shutter means 114 is extremely light, and suitable means may be provided to prevent it from turning on the guide rod 111 along which it slides. For example, this guide rod 111 may have a non-circular cross section passing through openings of the same cross section formed in elements which are fixed to and extend from the shutter. It will be noted that this assembly requires an extremely small amount of space, since the dimensions of the extension 115 need only be great enough to accommodate a slot 116 which is long enough to equal the diameter of the circle through which the pin 110 turns. This diameter, or the length of the slot 116, need only be slightly greater than the height of the aperture 105. Thus, it will be noted that the side wall 132 of the camera housing can be located much closer to the objective than is possible with the embodiment of FIGS. 1–5 described above, since with the embodiment of FIGS. 6 and 7 it is not necessary to provide a space sufficient to accommodate a rotary shutter. Thus, while in the embodiments of FIGS. 1–5 the distance between the axis of the shutter and the film-exposing aperture on one side of the shutter axis must be equal on the other side thereof to accommodate the rotary shutter, the distance between the wall 132 and the shaft 107 can be substantially less than the distance between the shaft 107 and the aperture 105.

Instead of a photosensitive means 123 in the form of a photocell which is connected directly to the meter 125, it is also possible in this case to use an electrical resistor whose resistance varies with changes in light intensity and connected to the meter in circuit with a battery.

The embodiment of the invention which is illustrated in FIG. 8 also includes a housing 101 provided with an entrance 102 for the light which reaches the objective 103 and passes therethrough to the film-exposing aperture 105. Also, the light-conducting means 121 and the photosensitive means 123 together with the meter 125 are identical with the embodiment of FIGS. 6 and 7. With the embodiment of FIG. 8 there is located in a plane which makes an angle of 45° with the optical axis an oscillatory shutter means 137 which swings angularly about a predetermined axis. For this purpose the camera includes a wall portion receiving a pin 138 fixed to the shutter plate 137 and forming a bearing for this pin, so that in this way the wall portion of the camera forms a support means supporting the shutter means 137 for oscillatory swinging movement about an axis which is inclined with respect to the optical axis, as is apparent from FIG. 8. The shutter drive shaft 139 extends parallel to the optical axis and is driven in any known way, and the shaft 139 is supported for rotary movement by suitable bearings one of which is formed by the opening in the transverse wall 140 of the camera housing. At its front end the shaft 139 fixedly carries a bevel gear 141 which meshes with a bevel gear 142 which is fixed to a shaft 144 which extends perpendicularly to the flat shutter 137 and which has a portion extending through an opening of a stationary wall 143 to be supported by the latter for rotary movement. A shoulder of the shaft 144 engages the wall 143 at one side thereof while a collar 145 fixed to the shaft 144 engages the other side of the wall 143 so that the shaft 144 cannot move axially and can only rotate in response to transmission of rotation 139 to the shaft 144 by the gears 141 and 142. At its front end the shaft 144 fixedly carries a disc 146 which in turn fixedly carries a pin 147 displaced from the axis of the shaft 144, so that in this way the rotary crank means is provided, and the pin 147 extends into an elongated slot 148 formed in the shutter 137, so that in this way the drive through the rotary crank means provides an oscillating means for oscillating the shutter 137 back and forth about the axis provided by the pin 138. The oscillating means oscillates the shutter means 137 in its own plane back and forth along the path which locates the shutter in positions covering and uncovering the aperture 105 during each operating cycle.

Between the end face 122 of the light-conducting means 121 and the photosensitive means 123 is located a light-reducing means 149 carried by an arm 128 in the same way as the embodiment of FIGS. 6 and 7 actuated in the same way by a rod 131. However, in the case of FIG. 8, the arm 128 does not carry an element 127 through which light can pass to a predetermined degree. Instead the arm 128 carries an opaque light-reducing means 150 which covers a fractional part of the end face 122 of the light-conducting means 121 when the camera is in its rest position. The extent to which the face 122 of the light-conducting means 121 is covered by the opaque light-reducing means 150 when the camera of FIG. 8 is at rest equals the extent to which it is necessary to reduce the light transmission to the photosensitive means 123 so that when the camera is stationary the photosensitive means will receive an amount of light equal to the average amount of light received by the photosensitive means 123 during each cycle of oscillation of the shutter 151 when the camera is operating.

In the embodiment of FIG. 8 the shutter means 151 is flat and oscillates at all times in its own plane which extends across the optical axis at an angle of 45°. That surface of the shutter 151 which is directed toward the objective 103 is provided with a light-reflecting layer 152 so that when the shutter 151 is between the objective 103 and the exposure aperture 105 light from the objective will be reflected by the surface 152 to the end face 120 of the light-conducting means 121 which transmits the light to the photosensitive means 123. Thus, during that part of each cycle when the aperture 105 is uncovered by the shutter the objective 103 will provide an accurate image of the subject on the film 106, while when the aperture 105 is covered by the shutter this same image will be transmitted to the end face 120 of the light-conducting means 121. In this way, exactly the same light used to form the image on the film is used to be transmitted to the photosensitive means 123 for regulating the setting of the camera. It is thus impossible to make any errors in exposure such as might occur if, for example, the arrangement were such that a larger part of the light from the sky reached the photosensitive means than the film itself, or vice-versa.

Of course, the light-reducing means can have locations other than that shown in FIGS. 6 and 8. For example, the light-reducing means may be located just in front of the end face 120 of the light-conducting means 121 and may be actuated only indirectly from the push-button 133.

It will be noted that in all embodiments of the invention the structure used to reduce the amount of light which reaches the photosensitive means when the camera is at rest will not change its manner of operation due to ageing or due to variations in temperature. For example, if the reduction required for proper setting with the camera at rest were brought about in an electrical manner as by introducing into the circuit of the photosensitive means and the measuring means an electrical resistor only when the camera was at rest, such an arrangement would change its operating characteristics with ageing and with variations in temperature so that a high degree of accuracy would not be guaranteed over a long period of time. However, with the structure of the invention the reduction in the light which reaches the photosensitive means when the camera is at rest is brought about in a purely optical manner simply by reducing the amount of light which reaches the photosensitive means so that the structure will operate in a very precise manner irrespective of ageing and temperature variations.

It will be understood that each of the elements described above, or two or more together, may also find a useful application in other types of motion picture cameras differing from the types described above.

While the invention has been illustrated and described as embodied in light measuring structures for motion picture cameras, it is not intended to be limited to the details shown, since various modifications and structural changes may be made without departing in any way from the spirit of the present invention as defined in the claims.

What is claimed as new and desired to be secured by Letters Patent is:

1. In a motion picture camera, in combination, an objective and a film-exposing aperture located along the optical axis of said objective and through which film is exposed; shutter means moving cyclically between said aperture and objective for covering and uncovering said aperture during each cycle of operation of said shutter means so that film is exposed only when said aperture is uncovered, said shutter means having a rest position covering said aperture and said shutter means having directed toward said objective a light-reflecting surface which reflects light received from said objective when said shutter means is between said aperture and said objective; photosensitive means receiving light from said surface of said shutter means; measuring means cooperating with said photosensitive means for measuring the light received thereby; light reducing means movable with respect to said shutter means between an inactive position out of the path of light directed toward said photosensitive means and an active position in which said light reducing means is located at least partly in the path of the light directed toward said photosensitive means; and operating means for moving said light reducing means from said active to said inactive position thereof when said shutter means is moved cyclically and for moving said light reducing means from said inactive to said active position thereof when said shutter means assumes its rest position to reduce the amount of light received by said photosensitive means when said shutter means is in its rest position to the amount of light received by said photosensitive means during each cycle of operation of said shutter means.

2. In a motion picture camera, in combination, an objective and a film-exposing aperture located along the optical axis of said objective and through which film is exposed; shutter means moving cyclically between said aperture and objective for covering and uncovering said aperture during each cycle of operation of said shutter means, said shutter means having a rest position covering said aperture; photosensitive means receiving light from said objective only when said shutter means is located between said aperture and said objective; opaque light reducing means movable with respect to said shutter means between an inactive position out of the path of light directed toward said photosensitive means and an active position in which said light reducing means is located at least partly in the path of the light directed toward said photosensitive means; and operating means for moving said light reducing means from said active to said inactive position thereof when said shutter means is moved cyclically and for moving said light reducing means from said inactive to said active position thereof when said shutter means assumes its rest position to reduce the amount of light received by said photosensitive means when said shutter means is in its rest position to an extent which will equal the amount of light received by said photosensitive means during each cycle of operation of said shutter means.

3. In a motion picture camera, in combination, an objective and a film-exposing aperture located along the optical axis of said objective and through which film is exposed; shutter means moving cyclically between said aperture and objective for covering and uncovering said aperture during each cycle of operation of said shutter means, said shutter means having a rest position covering said aperture; photosensitive means receiving light from said objective only when said shutter means is located between said aperture and said objective; opaque means movable with respect to said shutter means into a position partially covering said photosensitive means only when said shutter means is in its rest position for reducing the amount of light received by said photosensitive means when said shutter means is in its rest position to an extent which will equal the amount of light received by said photosensitive means during each cycle of operation of said shutter means; stop means stopping the operation of the camera when said opaque means is in its position partially covering said photosensitive means; and manually operable means operatively connected to said stop means and to said opaque means for moving said stop means to a position where it releases the camera for operation and for simultaneously moving said opaque means to a position where it no longer covers said photosensitive means, so that said opaque means does not influence the amount of light received by said photosensitive means during operation of the camera.

4. In a motion picture camera, in combination, an objective and a film-exposing aperture located along the optical axis of said objective and through which film is exposed; shutter means moving cyclically between said aperture and said objective for covering and uncovering said aperture during each cycle of operation of said shutter means so that film is exposed through said aperture only when said aperture is uncovered by said shutter means, said shutter means having a rest position covering said aperture and said shutter means having a light-reflecting surface directed toward said objective to reflect light therefrom when said shutter means is between said aperture and said objective; light-conducting means receiving light reflected by said shutter means and directing the same to a given location; photosensitive means located at said given location for receiving the light from said light-conducting means; measuring means cooperating with said photosensitive means for measuring the light received thereby; light reducing means movable with respect to said shutter means between an inactive position out of the path of light directed toward said photosensitive means and an active position in which said light reducing means is located at least partly in the path of the light directed toward said photosensitive means; and operating means for moving said light reducing means from said active to said inactive position thereof when said shutter means is moved cyclically and for moving said light reducing means from said inactive to said active position thereof when said shutter means assumes its rest position to reduce the light received by said photosensitive means when said shutter means is in said rest position thereof to an extent which will transmit to said photosensitive means when said shutter means is in said rest position an amount of light which at least approximately equals the amount of light received by said photosensitive means during each cycle of operation of said shutter means.

5. In a motion picture camera, in combination, an objective and a film-exposing aperture located along the optical axis of said objective and through which film is exposed; a flat shutter; oscillating means cooperating with said flat shutter for cyclically oscillating the same along a path extending between said aperture and objective for covering and uncovering said aperture during each oscillating cycle of said shutter, said oscillating means having a rest position locating said shutter in a position covering said aperture and said shutter having a light-reflecting surface directed toward said objective and receiving light therefrom to reflect said light when said shutter is between said aperture and said objective; photosensitive means receiving light reflected from said objective by said shutter; measuring means cooperating with said photosensitive means for measuring the light received thereby; light reducing means movable with respect to said shutter between an inactive position out of the path of light directed toward said photosensitive means and an active position in which said light reducing means is located at least partly in the path of the light directed toward said photosensitive means; and operating means for moving said light reducing means from said active to said inactive position thereof when said shutter is moved cyclically and for moving said light reducing means from said inactive to said active position thereof when said oscillating means assumes its rest position to reduce the light received by said photosensitive means when said oscillating means is in said rest position thereof to an extent which will transmit to said photo sensitive means an amount of light equal to that received by said photosensitive means during oscillation of said shutter.

6. In a motion picture camera, in combination, an objective and a film-exposing aperture located along the optical axis of the objective and through which film is exposed; a flat shutter located in a plane which extends across the optical axis; guide means guiding said shutter for oscillating movement in said plane along a path which extends between said aperture and said objective; oscillating means operatively connected to said shutter for oscillating the same in said path cyclically to positions covering and uncovering said aperture during each cycle of oscillation, said oscillating means having a rest position locating said shutter in a location covering said aperture and said shutter having a light-reflecting surface directed toward said objective to receive light therefrom and to reflect said light when said shutter is between said aperture and said objective; photosensitive means receiving light reflected by said surface of said shutter; light reducing means movable with respect to said shutter between an inactive position out of the path of light directed toward said photosensitive means and an active position in which said light reducing means is located at least partly in the path of the light directed toward said photosensitive means; and operating means for moving said light reducing means from said active to said inactive position thereof when said shutter is moved cyclically and for moving said light reducing means from said inactive to said active position thereof when said oscillating means assumes its rest position to reduce the amount of light received by said photosensitive means when said oscillating means is in said rest position thereof to an extent which will transmit to said photosensitive means when said oscillating means is in said rest position an amount of light equal to that received by said photosensitive means during each cycle of operation of said shutter.

7. In a motion picture camera, in combination, an objective and a film-exposing aperture located along the optical axis of said objective and through which film is exposed; a flat shutter located in a plane extending across the optical axis; guide means guiding said shutter for oscillating movement in a path which extends between said aperture and said objective; an extension fixed to and extending from said shutter and located in a plane normal to the optical axis; rotary crank means operatively connected to said extension for oscillating the latter and said shutter therewith along said path in a cyclical manner covering and uncovering said aperture with said shutter during each cycle of oscillation of said shutter, said rotary crank means having an axis of rotation which extends parallel to the optical axis, and said shutter having a light-reflecting surface directed toward said objective to receive light therefrom and to reflect said light when said shutter is between said aperture and said objective, said rotary crank means having a rest position locating said shutter in a position covering said aperture between the latter and said objective; photosensitive means receiving light reflected by said shutter from said objective; measuring means cooperating with said photosensitive means for measuring the light received thereby; and light-reducing means cooperating with said photosensitive means for reducing the light received thereby when said rotary crank means is in said rest position thereof to an extent which will transmit to said photosensitive means an amount of light equal to that received by said photosensitive means during oscillation of said shutter.

8. In a motion picture camera, in combination, an objective and a film-exposing aperture located along the optical axis of said objective and through which film is exposed; a flat shutter located in a plane extending across the optical axis between said objective and said aperture; support means supporting said shutter for swinging oscillating movement; oscillating means operatively connected to said shutter for oscillating the same in said plane along a path which cyclically locates said shutter in positions covering and uncovering said aperture, said oscillating means having a rest position locating said shutter in a position covering said aperture and said shutter having a light-reflecting surface directed toward said objective to reflect light which passes through said objective when said shutter is between said aperture and said objective; photosensitive means receiving light reflected from said shutter; measuring means cooperating with said photosensitive means for measuring the light received thereby; light reducing means movable with respect to said shutter between an inactive position out of the path of light directed toward said photosensitive means and an active position in which said light reducing means is located at least partly in the path of the light directed toward said photosensitive means; and operating means for moving said light reducing means from said active to said inactive position thereof when said shutter is moved cyclically and for moving said light reducing means from said inactive to said active position thereof when said oscillating means assumes its rest position to reduce the light reflected from said shutter to said photosensitive means to an extent which will transmit to said photosensitive means an amount of light equal to that received by said photosensitive means during oscillation of said shutter by said oscillating means.

9. In a camera, in combination, an objective and a film-exposing aperture located along the optical axis of said objective and through which film is exposed; a flat shutter located in a plane extending across the optical axis between said objective and aperture; support means supporting said shutter for oscillatory swinging movement about an axis inclined to the optical axis; rotary crank means having an axis of rotation parallel to the turning axis of said shutter and operatively connected to said shutter for oscillating the same in said plane cyclically along a path locating said shutter in positions covering and uncovering said aperture during each cycle of oscillation of said shutter, said crank means having a rest position locating said shutter in a position covering said aperture and said shutter having a light-reflecting surface directed toward said objective to receive light therefrom and reflect said light when said shutter is between said aperture and said objective; photosensitive means receiving light from said surface of said shutter; measuring means cooperating with said photosensitive means for measuring the light received thereby; light reducing means movable with respect to said shutter between an inactive position out of the path of light directed toward said photosensitive means and an active position in which said light reducing means is located at least partly in the path of the light directed toward said photosensitive means; and operating means for moving said light reducing means from said active to said inactive position thereof when said shutter is moved cyclically and for moving said light reducing means from said inactive to said active position thereof when said rotary crank means assumes its rest position to reduce the light received by said photosensitive means from said shutter to an extent which will transmit to said photosensitive means an amount of light equal to that received by said photosensitive means during oscillation of said shutter.

10. In a motion picture camera, in combination, an objective and a film-exposing aperture located along the optical axis of said objective and through which film is exposed; shutter means moving cyclically between said aperture and said objective for covering and uncovering said aperture during each cycle of operation of said shutter means, said shutter means having a rest position covering said aperture and said shutter means having a light-reflecting surface receiving light from said objective and reflecting said light when said shutter means is between said aperture and said objective; light-conducting means receiving light reflected by said shutter means and conducting the light to a given location; photosensitive means located at said given location and receiving light conducted by said light-conducting means; measuring means cooperating with said photosensitive means for measuring the light received thereby; light reducing means movable with respect to said shutter means between an inactive position out of the path of light directed toward said photosensitive means and an active position in which said light reducing means is located at least partly in the path of the light directed toward said photosensitive means; and operating means for moving said light reducing means from said active to said inactive position thereof when said shutter means is moved cyclically and for moving said light reducing means from said inactive to said active position thereof when said shutter means assumes its rest position for reducing the amount of light received by said photosensitive means to an extent which will transmit to said photosensitive means when said shutter means is in said rest position thereof an amount of light equal to that received by said photosensitive means during each cycle of operation of said shutter means, said light reducing means in said active position thereof being located between said light-conducting means and said photosensitive means.

11. In a motion picture camera, in combination, an objective and a film-exposing aperture located along the optical axis of said objective and through which film is exposed; a flat shutter; oscillating means cooperating with said flat shutter for cyclically oscillating the same along a path extending between said aperture and objective for covering and uncovering said aperture during each oscillating cycle of said shutter, said oscillating means having a rest position locating said shutter in a position covering said aperture and said shutter having a light-reflecting surface directed toward said objective and receiving light therefrom to reflect said light when said shutter is between said aperture and said objective; photosensitive means receiving light reflected from said objective by said shutter; measuring means cooperating with said photosensitive means for measuring the light received thereby; light reducing means movable with respect to said shutter between an inactive position out of the path of light directed toward said photosensitive means and an active position in which said light reducing means is located at least partly in the path of the light directed toward said photosensitive means; and operating means for moving said light reducing means from said active to said inactive position thereof when said shutter is moved cyclically and for moving said light reducing means from said inactive to said active position thereof when said oscillating means assumes its rest position to reduce the amount of light received by said photosensitive means to the amount of light received thereby during oscillation of said shutter.

References Cited by the Examiner

UNITED STATES PATENTS

| | | | |
|---|---|---|---|
| 1,934,484 | 11/1933 | Camilli | 352—141 |
| 2,471,750 | 5/1949 | Hunter | 250—227 X |
| 3,057,251 | 10/1962 | Mahn | 352—206 |

(Other references on following page)

UNITED STATES PATENTS

| | | | |
|---|---|---|---|
| 3,068,434 | 4/1963 | Edelstein | 352—141 X |
| 3,099,193 | 7/1963 | Freudenschuss | 352—141 |

FOREIGN PATENTS

| | | |
|---|---|---|
| 1,190,991 | 4/1959 | France. |
| 861,916 | 3/1961 | Great Britain. |
| 219,160 | 5/1942 | Switzerland. |

OTHER REFERENCES

German application 1,067,303, printed October 15, 1959.

German application 1,091,861, printed October 27, 1960.

NORTON ANSHER, *Primary Examiner.*

W. MISIEK, *Assistant Examiner.*